Oct. 13, 1964    G. T. HEMMETER    3,152,484
POSITIONER FOR A WHEEL BALANCER
Filed Feb. 17, 1961
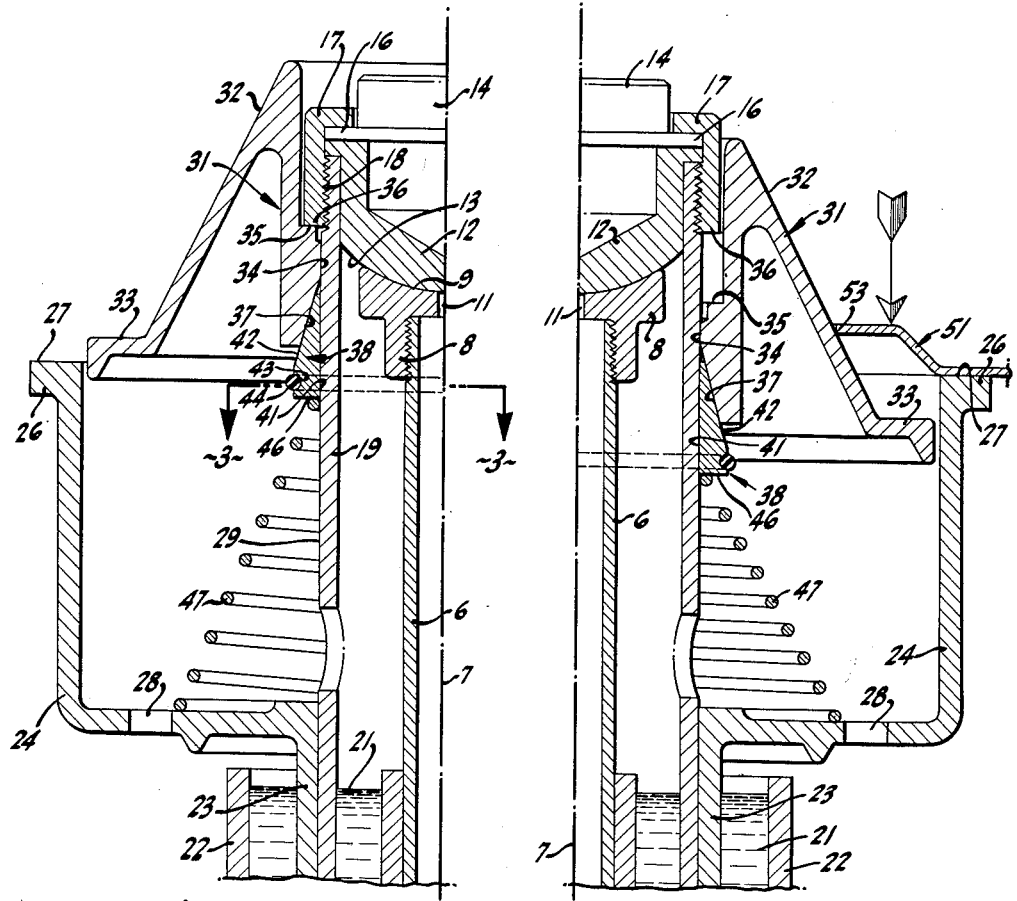
FIG-1                                     FIG-2
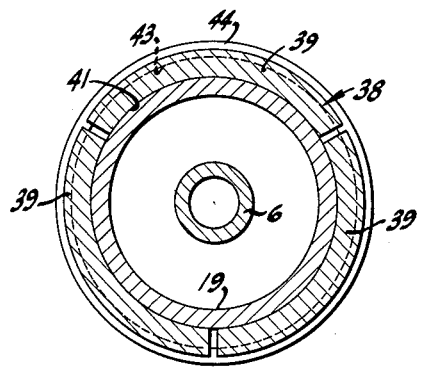
FIG-3
INVENTOR.
GEORGE T. HEMMETER
BY Lothrop & West
ATTORNEYS United States Patent Office 3,152,484
Patented Oct. 13, 1964

3,152,484
POSITIONER FOR A WHEEL BALANCER
George T. Hemmeter, 10791 Magdalena Ave.,
Los Altos, Calif.
Filed Feb. 17, 1961, Ser. No. 89,999
13 Claims. (Cl. 73—484)

My invention relates to means useful in connection with the balancing of a wheel, particularly an automobile wheel (including the tire), and is especially concerned with a bubble type balancer, for example of the sort shown in my copending application entitled "Wheel Balancer," Serial No. 81,422, filed January 9, 1961.

A bubble balancer of the indicated sort includes a base support on which is mounted a balance member, the mounting being such as to permit universal movement. The center of gravity of the item being balanced, such as an automobile wheel, is located below the center of support. A bubble glass affords an indication of tilting of the wheel structure with respect to the support. In order that the wheel may be reasonably accurately centered with respect to the axis of support of the balancer, there is usually supplied, centrally of the plate which bears the weight of the wheel, a centering device in the form of a spring pressed, upwardly projecting central cone. Since automobile wheels have central openings of various different diameters, the operator initially positions the wheel on the cone. The wheel then comes approximately to central position with more or less of the cone appropriately lodged within the particular central aperture of the wheel. The weight of the wheel and its assembled tire is sufficient to depress the engaged cone, thus compressing the cone-supporting spring until such time as the vehicle wheel comes to rest substantially in a horizontal plane and in abutment with the subjacent supporting plate. After the balancing operation has been completed, the wheel is lifted from the balancer and the relieved spring then restores the cone to its original position ready for subsequent use.

Since the cone is readily slidable on the central portion of the balancing member, there is necessarily introduced a clearance or space between the relatively slidable members. While this affords free sliding, this space or clearance is deleterious in that it permits a shifting of the actual balance center to one side or the other. The amount of this shifting or lateral motion is normally thought of as small, but is is sufficient, particularly in connection with relatively heavy wheels and tires, to leave an unbalanced condition considerably larger than the unit balance weights utilized. For example, if a wheel and tire assembly weighing fifty pounds is balanced on a balancer having a clearance between the sliding members of approximately ten one-thousandths of an inch (.010″), there results a balancing error equivalent to about eight inch-ounces or one ounce placed on an eight inch radius.

It is therefore an object of my invention to provide a positioner for a wheel balancer in which the deleterious effect of necessary working clearance between slidable parts is eliminated.

Another object of the invention is to provide a positioner for a wheel balancer effective to accurately center the wheel assembly to be balanced, despite variation in size of the central aperture through the wheel.

Another object of this invention is to produce a wheel balancer which properly centers with equal efficiency both light and heavy passenger car wheels.

Another object of the invention is to provide a positioner for a wheel balancer in which a centering member is not responsive to nor depressible by the weight of the wheel assembly to be balanced.

Another object of the invention is to provide an improved positioner for a wheel balancer.

Another object of the invention is in general to facilitate the operation of balancing wheels or wheel assemblies by the provision of an improved centering mechanism therefor.

Other objects together with the foregoing are attained in the embodiment of the invention described in the accompanying description and illustrated in the accompanying drawing in which:

FIGURE 1 is a cross section on a transverse vertical plane through the axis of the mechanism, the left half only of the symmetrical device being illustrated and the parts being in their relaxed condition;

FIGURE 2 is a cross section similar to FIGURE 1 showing the right-hand half of the symmetrical mechanism but with the parts in a position of use; and FIGURE 3 is a cross section the plane of which is indicated by the line 3—3 of FIGURE 1.

While the positioner for a wheel balancer pursuant to the invention can be embodied in a number of different forms, it has been successfully utilized as disclosed herein. In this arrangement there is provided a support 6 in the form of a hollow tube or pipe which is symmetrical about a central upright (usually vertical) axis 7. The pipe 6 is connected to a source of air under pressure and operates just as disclosed in my copending application. Parts of the positioner not shown herein are identical with those shown in the copending application.

At its upper end the pipe 6 is threaded to receive a socket member 8 which has an upper spherical concave surface 9. The socket member also is provided with a central air aperture 11 communicating with the interior of the pipe 6. Resting on the member 8 is a supporting member 12 having a lower spherical convex face 13 mating with the face 9 and of a sufficient extent so that a limited oscillation or swinging movement of the member 12 on the member 8 is readily accomplished. The swinging movement is attended with very small frictional resistance since air under pressure emanates from the opening 11 and escapes between the surfaces 9 and 13, thus affording an air bearing. The surfaces 9 and 13 swing or move relative to each other about a point which is approximately their center of curvature.

Clamped to the body 12 is a bubble indicator 14 of any standard sort. The device usually includes a chamber having a glass upper closure beneath which is an air bubble in an otherwise liquid filled chamber. There are cross marks or a circle on the glass to indicate the center of the bubble mechanism. The bubble device 14 has a flange 16 clamped in position against the body 12 by a clamp ring 17 connected by threads 18 to the upper end of a depending balance member 19. When the ring 17 is removed, the bubble unit 14 can also be removed and the mechanism can readily be disassembled. The balance member 19 is conveniently a tubular structure encompassing the support 6 and as its lower end extending into a body of liquid 21 contained within a central cup 22 supported on the pipe 6 at a convenient height. The liquid serves as a damping agent to suppress oscillations of the balance member 19.

Forming part of or attached to the lower portion of the balance member 19 is a hub 23 included in a cup-like datum stop 24. This element is especially characterized by an upper rim 26 terminating in an upwardly exposed planar face 27 in a plane perpendicular to the axis 7 when the mechanism is completely symmetrical and in balance. The datum member 24 is thus effective to provide a datum surface or datum plane 27 which is exactly level and horizontal when the device is in balance. The datum member 24 is provided with drain holes 28 so that it does not retain any unbalancing material.

In accordance with the invention, the exterior of the balance member 19, which encompasses the support 6 and depends therefrom, is carefully made to provide a circular cylindrical surface 29. Slidably disposed on the balance member is a centering device 31. This structure includes a conical exterior surface 32 ranging from a small diameter at the top to a large diameter at the bottom and effective to be encompassed and engaged by the central margins of the normal range of vehicle wheels. The upper end of the centering device 31 is rounded and extends slightly above the bubble indicator 14 so that in the uppermost position of the centering device the bubble indicator is protected against mechanical injury from wheels dropped onto the centering cone 31.

The outer portion of the centering cone 31 at the bottom of the conical surface 32 terminates in a step or shelf 33 and extends radially outward to a termination close to the interior of the datum stop 24 to preclude the ready entrance of foreign material.

The interior portion of the centering device 31 is provided with an interior cylindrical surface 34 made to slide easily on the surface 29 of the balance member, there being the usual machine clearance therebetween, a clearance of the order of several thousandths of an inch, say, five to seven thousandths of an inch. The upper portion of the centering member 31 is counterbored to provide a shoulder 35 designed to abut the lower depending portion 36 of the ring 17 when the centering device is in its uppermost position with respect to the balance member.

With the structure as so far described if normal practice were followed a spring could be provided to bear against the bottom portion of the datum member 24 and the upper portion of the centering device. Then when a wheel were positioned on the centering device, the spring would yield until such time as the wheel rested upon the datum plane 27. This structure, however, has substantial but necessary working clearance between the surfaces 34 and 29 and is responsible for some inaccuracy in the final result.

In accordance with my invention, therefore, I provide a special means for taking up or nullifying the effect of this clearance no matter what the position of the centering cone on the balance member. For that reason, the interior of the centering member 31 is provided with an interior conical surface 37. Designed to interengage with the centering member is a collet 38. This collet is conveniently made up of a plurality (for example, three) of collet wedges 39. The collet wedges when assembled constitute a self-centering collet for substantial circular concentric engagement with parts 31 and 19. The interior of the collet clutch wedges is finished to provide a nearly continuous circular cylindrical surface 41 designed to cooperate with the external cylindrical surface 29. The exterior of the collet wedges is finished to provide a nearly continuous conical surface 42 complementary to the surface 37. The collet wedges are also provided with an interrupted circumferential groove 43 receiving an elastic ring 44 or other convenient retaining member to simplify holding the collet wedges and to form them into a unified collet member.

Interposed between the lower face 46 of the collet and the bottom of the datum member 24 is a conical spring 47. The spring is so designed with respect to the remainder of the apparatus that collectively the spring and the resultant collet action are too resistant or strong in the assembled uppermost position to be deflected by the imposition of the weight of a wheel assembly on the centering cone 31 despite the fact that such wheel assembly may be the very heaviest for which the mechanism is designed or with which it can reasonably be operated. Furthermore, the angularity of the conical surfaces between the collet 37 and the member 19 must be such as to allow free disengagement when the axial engaging force is removed. Under these conditions the collet will be self-releasing when the axial force produced by the weight of the wheel (and opposed by the upward thrust of the spring) is removed.

It has been found in practice with ordinary structural materials as for example with mild steel and under ordinary circumstances of machining that a collet angle of twelve and one-half degrees of the conical surfaces 37 and 42 with respect to the axis 7 may prevent free disengagement of the collet and impose undue difficulty in separating such surfaces such that the positioning cone 32 will not return from the position shown in FIGURE 2 to the position shown in FIGURE 1 when the weight of the wheel is removed. A larger angle, for example, an angle of fifteen degrees, between such surfaces and the axis 7 is sufficient so that the collet has free disengagement properties under operating circumstances. In other words, the collet will not become self-locking when the axial engaging thrust is removed or diminished by removal of the tire from the balancer.

In the operation of this device, a wheel is first placed on the lifted centering device 31 (FIGURE 1). The cone remains fixed by spring thrust upward and by subsequent collet action. The wheel descends until the conical member fully occupies the central opening in the wheel; for example, at a point half way down the cone. The weight of the wheel and any apurtenances thereon even of the heaviest type for which the device is designed is insufficient in and of itself to depress the centering member 31. Positive action in centering the wheel on the cone is insured by the relatively high spring thrust and collet action which is adequate to support even the heaviest tire. At a very large collet angle, as for example where the collet angle is thirty degrees, the frictional force created by the collet action will be insufficient to overcome the thrust of the spring 47 and hence lighter tires will be lifted off of the datum plane 27.

The shoulder 35 is held against the stop 17 by the stressed spring 47 and subsequent collet action so that the imposition of the wheel weight does not in any fashion deflect or move the spring. The centering member 31 is thus firmly supported by the larger upthrust of the spring and by collet action and so is not responsive to the weight of the wheel. Springs designed to yield and allow positioning of light wheels on the datum plane 27 have been found ineffective in centering heavy wheels carelessly located on the cone and depressed downwardly.

After the wheel has been approximately leveled and centered by the operator as described, the wheel is then pressed downwardly. This is done by a mechanical depressor or by the operator. Sufficient force is exerted to compress the spring 47 by sliding the centering device 31 and the collet downwardly or in an axially downward direction from the position shown in FIGURE 1 toward and into the position shown in FIGURE 2. The angle of the collet wedges is sufficiently steep or large to preclude binding during this motion. In FIGURE 2 the wheel disc 51 is shown as having been forced downwardly far enough to come into abutment with the datum plane 27. Since the contact is circumferential, any previous irregularity in the horizontal positioning of the wheel is thus immediately and accurately corrected and the centering becomes precise on the cone 31.

As soon as this centered and leveled condition of the wheel has been attained, the operator removes his hands or other depressor from the wheel assembly. The wheel stays in place by a combination action of its weight and friction imposed by the collet over burdening the thrust of the spring. The spring 47 cannot lift the wheel 51 under these circumstances. What happens is that the spring 47 tends to expand upwardly and drives or urges the collet wedges 39 atxially upward into tight frictional engagement with the surface 37 of the centering member and the surface 29 of the balance member so that the clearance space between the centering member and the balance member is entirely taken up. Thus the centering member 31 is itself accurately centered or "chucked" with respect to the balance member so that the wheel axis coincides with the balancer axis. Mechanical operating clearances are entirely eliminated and are equal to zero.

While the upward thrust of the spring is ineffective to lift the wheel 51, it is effective to force the collet to position and hold the centering device during the balancing operation in the position to which it was depressed by the operator in positioning the wheel on the datum surface 27.

The balancing operation is carried on in the usual fashion and as described in my copending application. Following that, the operator lifts the wheel assembly 51 from the datum plane 27 and removes the wheel from the balancing device. As that occurs, the force engaging the collet is diminished and being self-releasing the thrust of the spring 47 is then effective to lift the collet and cone 31 along the surface 29 until the centering device is again positioned with its shoulder 35 in abutment with the stop 36 ready for a subsequent operation. If the angle of the conical interengaging surfaces 37 and 42 is excessively small or shallow, then the upward force of the spring 47 will drive the collet wedges into non-disengaging position with the centering member 31 and the balance member 19 such that the centering member will not lift after the removal of the wheel assembly 51. In practice it has been found that conical inclination of the surfaces 37 and 42 of fifteen degrees or more for mild steel to the axis 7 permits free disengagement. Then the upward force of the spring on the collet has a sufficient vertical component to lift the centering member 32 and slide it vertically on 19 until the stop is encountered.

The range of angularity of the conical surfaces 37 and 42 is dependent upon the frictional characteristics of the structural materials used. It will be appreciated that the surfaces must be conical to take up mechanical play or clearances and to produce increased resistance to downward thrust for positive centering of both light and heavy wheels and at the same time hold the relatively heavy spring depressed for light-weight wheels on the datum plane during balancing. The collet wedges and their associated members are not particularly affected by lubrication or the lack of it because as friction is diminished by lubricating surface contact between 38 and 19, it likewise is effective in diminishing the friction between surfaces 42 and 37; hence the efficiency of the collet in producing a horizontal squeezing force is increased to offset the diminished coefficient of friction between the surfaces 38 and 19. In other words, the effect of lubrication or of the lack of lubrication is cancelled out by the design. The angular range for the proper frictional characteristics is sufficiently wide and non-critical as to make feasible the construction disclosed.

What is claimed is:

1. A positioner for a wheel balancer comprising a support, a balance member mounted on said support, means on said balance member constituting a datum stop, a centering device, means for mounting said centering device for sliding movement on said balance member toward and away from said datum stop, a friction collet engageable with said mounting means and said balance member, and a spring engaging said balance member and said friction collet for urging said collet into tight frictional engagement with said mounting means and said balance member, said spring being responsive to weight applied to said centering device to frictionally lock said centering device to said balance member when the weight applied thereto is between predetermined maximum and minimum values.

2. A positioner for a wheel balancer comprising a support, an upright balance member mounted on said support, a datum stop on said balance member, a centering device slidable upon and down said balance member adjacent said datum stop, means interposed between and movable into and out of engagement with said centering device and said balance member for frictionally securing said centering device on said balance member and releasing said centering device therefrom, and weight responsive means for urging said movable means into engagement with said centering device and said balance member, said weight responsive means being adapted to respond to weight on said centering device having a magnitude intermediate predetermined minimum and maximum magnitudes to frictionally secure said centering device on said balance member and to release said centering member to allow sliding motion relative to said balance member when the weight on said centering device is less than said predetermined minimum and greater than said predetermined maximum.

3. A device as in claim 2 in which said urging means is a spring.

4. A positioner for a wheel balancer adapted to operate with a wheel having a predetermined weight comprising a support, an upright balance member mounted on said support, said balance member having an exterior cylindrical surface, a datum stop on said balance member, a centering device slidable on said balance member adjacent said datum stop and said exterior cylindrical surface, means on said centering device having an interior conical surface, a collet wedge having an interior surface engageable with said exterior cylindrical surface and having an exterior conical surface engageable with said interior conical surface, and a spring disposed to be compressed between said collet wedge and said balance member and compressible therebetween only by a force in excess of that due to said predetermined weight.

5. A positioner for a wheel balancer comprising a support, a tubular balance member mounted to swing on said support, a centering cone surrounding and slidable on said balance member, and means responsive to the application of a predetermined weight to said centering cone to frictionally engage said balance member and said centering cone for frictionally holding said centering cone and said balance member together in any selected relative position thereof.

6. A positioner for a wheel balancer comprising a support, a tubular balance member mounted to swing on said support, a centering device surrounding and slidable on said balance member, a collet wedge movable into and out of frictional engagement with both said balance member and said centering device for wedging said centering cone and said balance member together in any selected relative position thereof upon the application of a predetermined weight to said centering cone and for releasing said wedging action upon the removal of said weight, and spring means for urging said collet wedge into said frictional engagement.

7. A positioner for a wheel balancer comprising a support, a tubular balance member mounted to swing on said support, a centering device surrounding and slidable on said balance member by reason of radial clearance therebetween, and means engageable with and releasable from said balance member and said centering device in any slidable position thereof for preventing relative radial movement of said centering device and said balance member due to said clearance.

8. A positioner for a wheel balancer comprising a support, a cylindrical balance member encompassing and depending from said support, a centering device surrounding and slidable on said balance member, a stop on said balance member for limiting sliding motion of said centering device in one direction, means on said centering device providing an interior conical surface, a plurality of collet wedges having interior cylindrical surfaces and exterior conical surfaces, means for yieldably holding said collet wedges with the interior cylindrical surfaces thereof against said cylindrical balance member, and spring means for urging said collet wedges toward said stop and with the exterior conical surfaces thereof against the interior conical surface of said centering device, said spring means being adapted to provide locking engagement of said collet wedges intermediate said centering device and said balance member whenever a force greater than predetermined minimum and less than predetermined maximum values is applied to said centering device.

9. A positioner for a wheel balancer comprising an upright cylindrical balance member, a centering device adapted to be engaged by and bear the weight of a wheel, said centering device including means forming an interior cylindrical surface slidable up and down on said cylindrical balance member and including means forming an interior conical surface, a collet wedge disposed between said cylindrical balance member and said means forming an interior conical surface, and spring means mounted to urge said collet wedge into engagement with said balance member and said centering member, said spring means being adapted to prevent relative sliding movement between said centering device and balance member whenever a wheel having a weight intermediate predetermined maximum and minimum magnitudes is applied to said centering device.

10. A positioner for a wheel balancer comprising an upright balance member having a cylindrical exterior surface, a centering device surrounding said balance member and adapted to be engaged by and bear the weight of a wheel, said centering device including a cylindrical interior surface slidable up and down on said cylindrical exterior surface with radial clearance and said centering device including a conical interior surface, a collet wedge surrounding said balance member and having a cylindrical interior surface slidable up and down on said cylindical exterior surface and having a conical exterior surface adapted to engage said conical interior surface, and a spring at one end engaging said balance member and at the other end engaging said collet wedge, said spring being adapted to bias said exterior conical surface and said interior conical surface into engagement without substantial radial clearance and to allow relative motion between said centering device and said balancing member in a first direction when a weight exceeding a predetermined maximum value is present on said centering device, to frictionally retain said centering device and said balancing member in relative stationary position therebetween when a weight less than said maximum value and greater than a predetermined minimum value is present on said centering device, and to allow relative motion between said centering device and said balancing member in a second direction when a weight of less than said minimum value is present on said centering device.

11. A positioner for a wheel balancer comprising a support, a balance member mounted on said support, a datum stop on said balance member, a centering device slidable on said balance member toward and away from said datum stop, means forming an interior conical surface on said centering device, a collet wedge having an interior surface adapted to engage the surface of said balance member and having an exterior surface adapted to engage the interior conical surface on said centering device, and a spring interposed between and pressing against said balance member and said collet wedge, said spring being adapted to normally urge said collet wedge and said centering device away from said datum stop, to allow movement of said centering device toward said datum stop upon the application of a weight exceeding a predetermined maximum value thereto and to provide tight frictional engagement to prevent relative motion between said centering device and said datum stop when a weight thereon is less than said predetermined maximum value.

12. A positioner for a wheel balancer comprising a support, an upright balance member mounted on said support, a datum stop on said balance member, a centering device slidable up and down said balance member adjacent said datum stop, means interposed between and movable into and out of engagement with said centering device and said balance member for frictionally securing said centering device on said balance member and releasing said centering device therefrom, and spring means unyieldable under the weight of the heaviest wheel for which said positioner is designed for urging said movable means into engagement with said centering device and said balance member.

13. A positioner for a wheel balancer comprising an upright cylindrical balance member, a centering device adapted to be engaged by and bear the weight of a wheel, said centering device including means forming an interior cylindrical surface slidable up and down on said cylindrical balance member and including means forming an interior conical surface, a collet wedge disposed between said cylindrical balance member and said means forming an interior conical surface, the angle of said interior conical surface and the angle of said collet wedge being such as to release said centering device from said collet wedge when said centering device is devoid of the weight of said wheel, and spring means mounted to urge said collet wedge into binding engagement with said balance member and said centering member.

References Cited in the file of this patent

UNITED STATES PATENTS

| 1,998,728 | Marles | Apr. 23, 1935 |
| 2,909,063 | Bageman | Oct. 20, 1958 |
| 2,913,251 | Herbenar | Nov. 17, 1959 |

FOREIGN PATENTS

| 750,987 | Great Britain | June 20, 1956 |